(12) United States Patent
Sasano et al.

(10) Patent No.: US 6,590,717 B2
(45) Date of Patent: Jul. 8, 2003

(54) OPTICAL SYSTEM FOR OPTICAL DISK, OPTICAL HEAD UNIT FOR OPTICAL DISK, AND OPTICAL DRIVE DEVICE

(75) Inventors: Tomohiko Sasano, Osaka (JP); Yasuhiro Tanaka, Ashiya (JP); Michihiro Yamagata, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/129,234

(22) PCT Filed: Sep. 25, 2001

(86) PCT No.: PCT/JP01/08323
§ 371 (c)(1),
(2), (4) Date: May 2, 2002

(87) PCT Pub. No.: WO02/27715
PCT Pub. Date: Apr. 4, 2002

(65) Prior Publication Data
US 2002/0186476 A1 Dec. 12, 2002

(30) Foreign Application Priority Data
Sep. 26, 2000 (JP) ........................................ 2000-292179

(51) Int. Cl.$^7$ .......................... G02B 13/18; G11B 7/135
(52) U.S. Cl. ................... 359/717; 359/179; 369/112.23
(58) Field of Search ............................... 359/716, 717, 359/718, 719; 369/112.23, 112.24

(56) References Cited

U.S. PATENT DOCUMENTS 4,457,590 A  *  7/1984  Moore ........................ 359/654
6,490,100 B1 * 12/2002  Sasano et al. .............. 359/719

FOREIGN PATENT DOCUMENTS

| JP | 11-190818 | 7/1999 |
| JP | 11-273123 | 10/1999 |
| JP | 11-316963 | 11/1999 |

* cited by examiner

Primary Examiner—Scott J. Sugarman
(74) Attorney, Agent, or Firm—Merchant & Gould, P.C.

(57) ABSTRACT

An optical system for an optical disk, comprising a light source (61), a collimating optical system (63) for converting a luminous flux from the light source into parallel rays of light, and an object lens (66) for condensing the parallel rays onto the information recording surface (71) of an optical disk. The object lens consisting of two or three lenses and having a numerical aperture (NA) of at least 0.82 enables a high-density recording. Since a third-order astigmatism produced when the object lens is tilted 0.7 degree with respect to an optical axis is as small as up to 10 m lambda, a residual aberration, after a third-order comatic aberration produced when the optical disk is tilted due to warping or the like is corrected by tilting the optical lens, can be reduced. Therefore, a tilted optical disk still can ensure a satisfactory recording and/or reproducing quality.

37 Claims, 6 Drawing Sheets

OPTICAL SYSTEM FOR OPTICAL DISK, OPTICAL HEAD UNIT FOR OPTICAL DISK, AND OPTICAL DRIVE DEVICE

TECHNICAL FIELD

The present invention relates to an optical system for use with an optical disk, which focuses a luminous flux from a light source on an information recording surface of an optical disk such as a digital video disk, a digital audio disk, or an optical memory disk for use in a computer. The present invention also relates to an optical head device that is provided with the optical system for use with an optical disk, and to an optical drive device that is provided with the optical system for use with an optical disk.

BACKGROUND ART

Generally, in optical head devices for use with optical disks, many of the lenses used as objective lenses for recording information or reproducing recorded information by focusing light so as to form a point image at the diffraction limit on an information recording surface of an optical disk are single lenses having aspherical surfaces.

The following will describe a conventional optical head device, while referring to the drawings.

Figure 5:
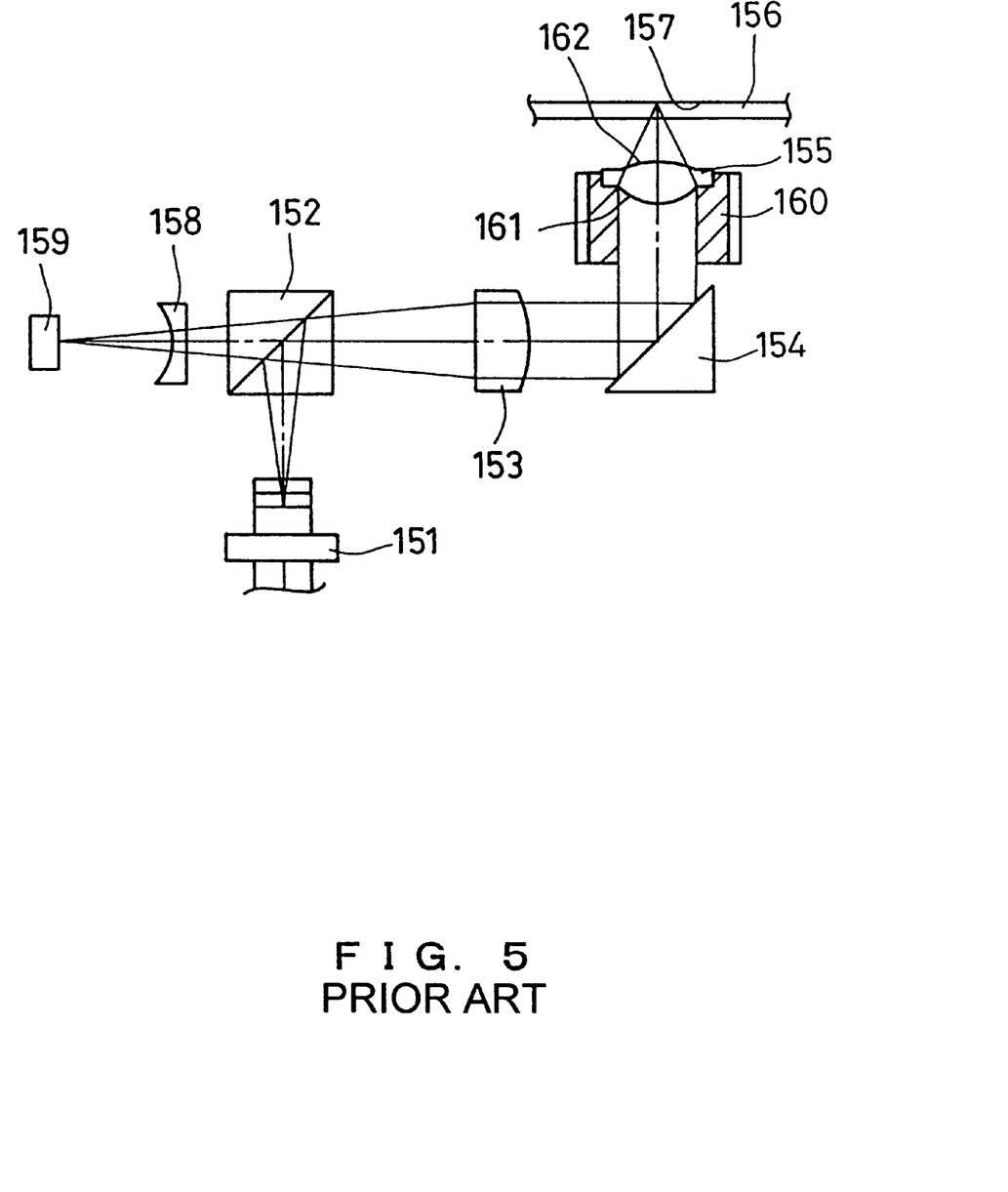
FIG. 5 is a view illustrating a configuration of a conventional optical head device.

FIG. 5 is a view illustrating a schematic configuration of a conventional optical head device. As shown in FIG. 5, an optical path of a luminous flux emitted from a semiconductor laser 151 is redirected by a beam splitter 152, and the luminous flux is converted into a substantially collimated light by a collimator lens 153. The optical path of the laser beam is redirected further by a turning mirror 154, and the laser beam is focused on an information recording surface 157 of an optical disk 156 by an objective lens 155. Here, the objective lens 155 is actuated by an actuator 160. The laser beam focused on the information recording surface 157 of the optical disk 156 is diffracted by recesses and projections formed on the information recording surface 157. The laser beam reflected and diffracted by the information recording surface 157 of the optical disk 156 passes through the objective lens 155, and its optical path is redirected by the turning mirror 154. Then, the laser beam passes the collimator lens 153, the beam splitter 152, and a cylindrical lens 158, thereby being focused on a photodetector 159. Changes in the light quantity due to modulation at the information recording surface 157 of the optical disk 156 are detected according to electric signals from the photodetector 159, and thus, the reading of data on the information recording surface 157 is carried out.

Here, the objective lens 155 has a wave aberration due to manufacturing errors caused during the manufacture. To consider the wave aberration, it can be separated into aberration components, which are a third-order spherical aberration, a third-order coma, a third-order astigmatism, and a high-order aberration.

Among these aberration components, the third-order coma does not occur according to design as long as lens surfaces are rotationally symmetric surfaces. However, actually, a third-order coma occurs due to, as predominant factors, the decentering (deviation in a direction perpendicular to the optical axis) between a first surface 161 of the objective lens 155 on a collimated luminous flux side and a second surface 162 thereof on a light-focusing side, as well as a tilt (relative to a surface perpendicular to the optical axis) of the first surface 161 of the objective lens 155, or of the second surface 162 thereof, or of the both. The decentering and the tilt are produced in the manufacturing process.

Recently, higher densification of recording has been achieved, as seen in digital versatile disks (DVDs), DVD-RAMs, etc. To achieve higher densification, to form as small a light spot as possible on an optical disk is significant, and it is known that the spot diameter can be decreased by increasing a numerical aperture (NA) of a lens and by shortening a wavelength of light. The numerical aperture of a lens has increased gradually for higher densification. The NA and the wavelength for DVDs are 0.6 and 660 nm, respectively. At the present time, one disk (single-sided) is required to have a memory capacity of approximately 25 GB to record high-definition video data for 2 hours, assuming a movie and the like. This means a recording density approximately five times that of a DVD, and therefore, it is necessary to reduce the spot area to one fifth. In other words, the spot diameter has to be 0.45 time. For shortening the wavelength, laser beam sources with wavelengths in the vicinity of 405 nm has become available in the market. As it is known that the spot diameter is proportional to the NA and inversely proportional to the wavelength, a lens is required to have a NA of not less than 0.82.

Conventionally, lenses are designed, considering manufacturing errors that could occur when a lens is manufactured or assembly errors that could occur when a lens is assembled in an optical head, so that the aberration should not increase even in the case where the first and second surfaces of the lens have the decentering, as well as so that the aberration should not increase even in the case where light enters from outside the axis. One of the reasons why lenses with greater NAs, for instance, 0.82, are demanded significantly but have not yet been brought into the actual use is as follows: merely to decrease the aberration on the axis in lens designing is easy, but in the case where a lens is designed with the fabrication tolerance and the assembly tolerance taken into consideration, it is very difficult to design a single lens having sufficient tolerances.

Therefore, as a method for increasing the numerical aperture of the objective lens, a technique has been applied such that two or three lenses are combined to configure an objective lens, so as to increase the manufacturing tolerances for each lens.

A problem remaining in the objective lens is that a third-order coma generated due to a tilt of a disk increasing as the numerical aperture of the objective lens increases, and it also increases as the thickness of a transparent substrate of the disk (transparent substrate formed on the objective lens side of an information recording surface of an optical disk; also referred to as "optical disk substrate") increases.

The thickness of the disk preferably is as small as possible from the above-described viewpoint. However, in the case where the disk is thin, the luminous flux from the objective lens has a smaller area on the surface of the transparent substrate of the disk, thereby resulting in that the recording/reproduction performance deteriorates due to dust and scratches on the surface of the transparent substrate. As a result of studies by the inventors of the present invention, it has been discovered that the luminous flux desirably has a diameter of approximately 130 μm on the disk, in order not to impair the recording/reproduction performance even in the case where dust and scratches in a size of several tens of micrometers each are present. To satisfy this requirement, in the case where the NA is assumed to be 0.82 and the refractive index of the transparent substrate of the disk is assumed to be 1.5, the transparent substrate desirably is 0.1 mm thick, which is found by calculation. Besides, for manufacturing, the thickness of the transparent substrate of approximately 0.1 mm is appropriate at the present stage, since the productivity decreases in mass production in the case of too thin disk transparent substrates. In light of the foregoing, it is adequate that the disk has a thickness of 0.1 mm.

At present, there is a possibility that the disk surface could tilt approximately 0.7 degree relative to the optical axis due to warpage of the disk or the like. When tilting of this degree occurs, a third-order coma at a level of 79 m$\lambda$ is generated in the case of an optical system having a numerical aperture of 0.85, a focal distance of 1.8 mm, and a transparent substrate thickness of 0.1 mm. To make a spot sufficiently small on the information recording surface and reproducible by a DVD system, it is required to suppress the third-order coma to a level of 70 m$\lambda$ or below. Therefore, in the case where the aforementioned third-order coma occurs due to the tilt of the disk, the data recording/reproduction is impossible with the foregoing optical system.

Generally, tilting of a lens relative to the optical axis generates a third-order coma. Therefore, by tilting the objective lens according to the tilt of the disk, the third-order coma generated by the tilt of the disk is cancelled by a third-order coma generated by the tilt of the objective lens, which results in that the third-order coma substantially can be nullified.

An optical head device is disclosed by JP 11(1999)-316963 A, which is equipped with a mechanism (tilt mechanism) for tilting an objective lens to perform excellent recording/reproduction even when tilting of a disk occurs. A schematic configuration of the same is shown in FIGS. 6A and 6B.

Figure 6A:
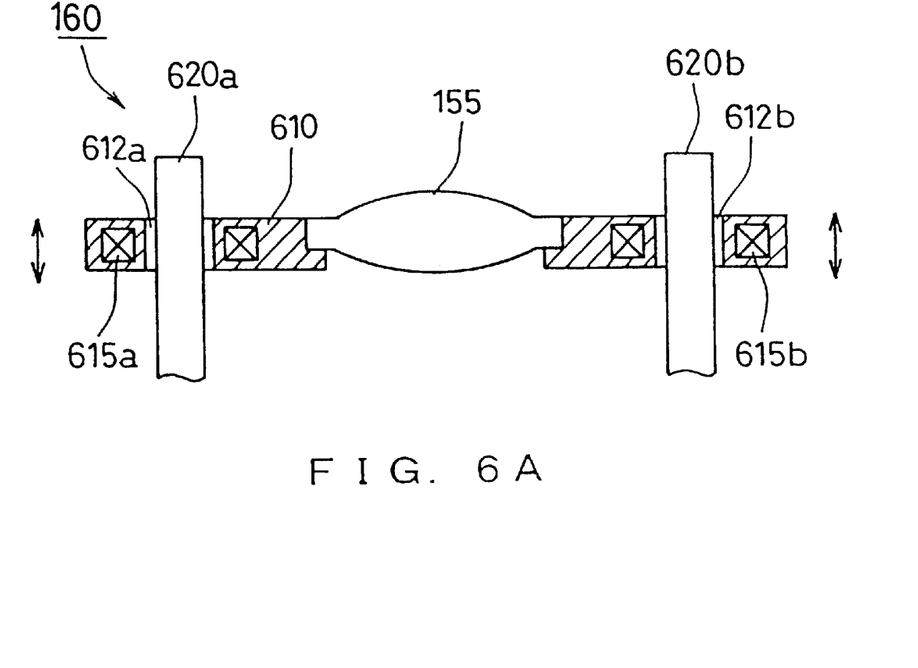
FIG. 6A is a cross-sectional view for explaining a focus adjusting operation by an objective lens actuator.
Figure 6B:
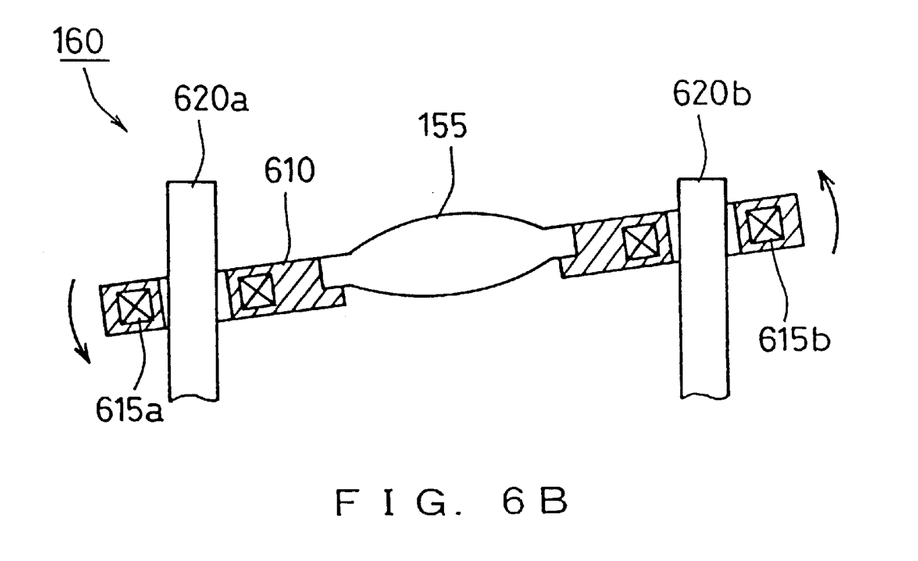
FIG. 6B is a cross-sectional view for explaining a tilt adjusting operation by the objective lens actuator.

In FIGS. 6A and 6B, 155 denotes an objective lens. 610 denotes a lens holder for holding the objective lens 155. 612a and 612b denote through holes provided in the lens holder 610. 615a and 615b denote coils, each in an approximately ring form, provided in the lens holder 610 so as to surround the through holes 612a and 612b, respectively. 620a and 620b denote a pair of permanent magnets that pass entirely through the through holes 612a and 612b, respectively, in a manner in which play remains. The permanent magnets 620a and 620b in pair have a polarity in the same direction, and are placed on an optical head base. The lens holder 610 is held by the optical head base via an elastic member that is not shown. An actuator 160 also serves as an actuator for focusing and tracking of the objective lens 155. The focus adjustment is performed by moving the objective lens 155 upward and downward as viewed in the drawing, as shown in FIG. 6A, by passing current in the same direction through the coils 615a and 615b in pair. On the other hand, it is possible to tilt the objective lens 155 as shown in FIG. 6B, by passing current in opposite directions through the pair of coils 615a and 615b, respectively (or alternatively, by passing current through only one of the pair of the coils 615a and 615b).

Thus, even in the case where the disk is tilted, a third-order coma can be corrected excellently by tilting the objective lens according to the tilt of the disk by means of such a tilt mechanism.

However, in the case where a third-order coma due to a tilt of the disk is corrected by tilting the objective lens as described above, aberrations other than the third-order coma occur, which are caused by the tilting of the objective lens relative to the optical axis. As a result, the reproduction performance is not improved significantly.

Furthermore, in the case where information is recorded in a disk by, for instance, the phase-change recording method, the focus control of the lens is carried out by varying a power of a light source, as is carried out with respect to DVD-RAMs at the present time. Deviations of the focus position are caused due to the wavelength variation that occurs as the power varies, and therefore, a lens having a greater NA, which therefore has a smaller depth of focus, becomes incapable of adjusting the focus appropriately.

DISCLOSURE OF THE INVENTION

The present invention has been made to solve the above-described problems of the prior art and proposes a novel design idea for achieving a large-numerical-aperture lens with a NA of not less than 0.82. It is an object of the present invention to provide an optical system for use with an optical disk, an optical head device for use with an optical disk, and an optical drive device, each of which includes an objective lens having an increased numerical aperture and being capable of correcting the deterioration of performance caused by tilting of the disk.

To achieve the foregoing object, the present invention is configured as follows.

A first optical system of the present invention, for use with an optical disk, is an optical system for use with an optical disk for recording and/or reproducing information to and/or from an optical disk, which includes a light source, a collimating optical system for converting a luminous flux from the light source into a collimated light, and an objective lens for focusing the collimated light on an information recording surface of the optical disk. In the optical system, the objective lens has a numerical aperture (NA) of not less than 0.82, the objective lens is composed of two or three lenses, and a third-order astigmatism generated in the case where the objective lens is tilted 0.7 degree relative to an optical axis is not more than 10 m$\lambda$.

According to the first optical system for use with an optical disk, the high-density recording can be implemented since the numerical aperture (NA) of the objective lens is not less than 0.82.

Besides, since the third-order astigmatism generated when the objective lens is tilted 0.7 degree is small, it is possible to suppress a remaining aberration in the case where a third-order coma generated when an optical disk tilts because of warpage or the like is corrected by tilting the objective lens. Consequently, excellent recording/reproduction can be performed even in the case where an optical disk tilts.

In the first optical system for use with an optical disk, it is preferable that the optical disk includes a transparent substrate with a thickness of approximately 0.1 mm on an objective lens side of the information recording surface, and that a third-order astigmatism generated in the case where a third-order coma generated in the case where the optical disk tilts 0.7 degree is corrected by tilting the objective lens is not more than 10 m$\lambda$.

According to this preferred configuration, in the case where a third-order coma caused by warpage of an optical disk or the like is corrected by tilting the objective lens, a third-order astigmatism generated is not more than 10 m$\lambda$. Therefore, the third-order coma resulting from an optical disk is corrected excellently, and at the same time, a remaining astigmatism that significantly affects the recording/reproduction performance is not more than 10 m$\lambda$. Accordingly, excellent recording/reproduction is ensured.

Next, a second optical system of the present invention, for use with an optical disk, is an optical system for use with an optical disk for recording and/or reproducing information to and/or from an optical disk, which includes a light source, a collimating optical system for converting a luminous flux from the light source into a collimated light, and an objective lens for focusing the collimated light on an information recording surface of the optical disk. In the optical system, the objective lens has a numerical aperture (NA) of not less than 0.82, and is composed of two or three lenses. The optical disk includes a transparent substrate with a thickness of approximately 0.1 mm on an objective lens side of the information recording surface. Further, a third-order astigmatism, generated in the case where a third-order coma generated when tilting of the optical disk by 0.7 degree is corrected by tilting the objective lens, is not more than 10 mλ.

According to the second optical system for use with an optical disk, the high-density recording can be implemented since the numerical aperture (NA) of the objective lens is not less than 0.82.

Besides, in the case where a third-order coma caused by warpage of an optical disk or the like is corrected by tilting the objective lens, a third-order astigmatism generated is not more than 10 mλ. Therefore, the third-order coma due to an optical disk is corrected excellently, and at the same time, a remaining astigmatism that significantly affects the recording/reproduction performance is not more than 10 mλ. Accordingly, excellent recording/reproduction is ensured.

In the first and second optical systems for use with an optical disk, it is preferable that a third-order spherical aberration that occurs when the luminous flux is focused via a transparent substrate with a thickness of 0.1 mm is not more than 70 mλ.

The objective lens is corrected so that, when a luminous flux from the light source is focused through the 0.1 mm thick transparent substrate on a rear surface thereof, which substrate has optical characteristics identical to those of the transparent substrate of the optical disk used herein, a third-order spherical aberration generated here is not more than 70 mλ. Therefore, the optical system can be employed with respect to an optical disk having a 0.1 mm thick substrate. In the case where an optical disk has a thick substrate, a third-order coma generated when the optical disk tilts increases. In the case of high-density recording employing an objective lens with a NA of not less than 0.8 in particular, the generation of such a third-order coma is critical. For instance, in the case where the objective lens has a NA of 0.85 and a focal distance of 1.8 mm and an optical disk tilts 0.7 degree, a third-order coma generated is approximately 480 λ in the case where the disk has a thickness of 0.6 mm, and approximately 79 mλ in the case where the disk has a thickness of 0.1 mm. Therefore, to suppress the generated third-order coma to a correctable level, the disk substrate preferably is as thin as possible, and the thickness of the disk substrate adequately is 0.1 mm, considering the present disk manufacturing techniques, the facilitation of handling, and the soil resistance to withstand fingerprints or dust on the disk. With the optical system of the above-described preferred configuration, it is possible to perform excellent recording and/or reproduction with respect to an optical disk having a 0.1 mm thick substrate, even in the case where the optical disk tilts.

Furthermore, in the first and second optical systems for use with an optical disk, a chromatic aberration of the objective lens at a wavelength of the light source preferably is not more than 0.1 μm/nm.

According to this preferred configuration, light with a wavelength of the used light source is subjected to excellent achromatization (correction of a chromatic aberration). Therefore, the light from the light source is kept in an excellent focused state even in the case where the light from the light source has a spectral bandwidth in the vicinity of the used wavelength. Furthermore, when a laser power varies due to the switching between recording and reproduction, etc., usually the wavelength varies several nanometers. In such a case, if the achromatization is not applied, a position of the spot formed by the objective lens abruptly shifts, thereby possibly preventing an automatic focusing device from functioning normally. However, in the above-described preferred optical system, since the achromatization is applied, the automatic focusing device can be allowed to function appropriately.

Furthermore, in the first and second optical systems for use with an optical disk, it is preferable that the objective lens is composed of three lenses, which are a first lens that is a spherical lens, a second lens that is a spherical lens, and a third lens that is an aspherical lens, which are arranged in the stated order from a light source side, and that the first lens and the second lens are cemented to each other so as to compose a doublet.

By forming the objective lens in a two-group configuration in which a doublet of two spherical lenses and one aspherical lens are arranged in the this order from the light source side to the optical disk side, as in such a preferred configuration, it is possible to allow the lens position adjustment to be performed at only one position, thereby facilitating the assembly. Furthermore, since the cementing surface is spherical, the lens surface can be evaluated as to the single lens as a whole, thereby facilitating the checking of the cementing precision.

Here, the third lens preferably has a flat surface on an optical disk side. This makes it possible to ensure the processing precision of a lens-molding die. Further, there is no need to perform grinding by means of a grindstone or the like. Therefore, a factor that deteriorates the profile irregularity such as tool marks is not present, and the profile irregularity can be ensured readily. This particularly is important for a surface of the third lens on the optical disk side, at which the luminous flux has the minimum effective diameter.

Furthermore, it is preferable that a light-source-side surface and an optical-disk-side surface of the first lens have a same radius of curvature. This makes it unnecessary to determine a front side and a rear side, thereby making the first lens suitable for the mass production.

Furthermore, the third lens preferably has an aspherical surface on a light source side. This ensures excellent correction of a third-order spherical aberration, and makes it possible to increase a tolerance for the position adjustment between the doublet composed of two spherical lenses and the third lens.

Furthermore, it is preferable that a light-source-side surface and an optical-disk-side surface of the first lens have the same radius of curvature, and that the relationship expressed as $-20<53d+16R-69f<20$ is satisfied, where R represents the radius of curvature of the surfaces of the first lens, d represents a thickness of the third lens, and f represents a focal distance of the objective lens. This makes it possible to decrease a third-order astigmatism generated in the case where a third-order coma generated due to a tilt of the optical disk is corrected by tilting the objective lens.

Next, a first preferred configuration of the objective lens in the first and second optical systems for use with an optical disk is as follows.

The objective lens is composed of three lenses that are a first lens that is a spherical lens, a second lens that is a spherical lens, and a third lens that is an aspherical lens, which are arranged in the stated order from a light source side. The first lens and the second lens are cemented to each other so as to compose a doublet. The first lens has a refractive index of not more than 1.54, and a light-source-side surface and an optical-disk-side surface of the first lens have the same radius of curvature of not more than 3.3 mm. The second lens has a refractive index of not less than 1.7. The third lens has a refractive index of not less than 1.68 and a thickness of not less than 1.85 mm, and has an aspherical surface on the light source side and a flat surface on an optical disk side.

A second preferred configuration of the objective lens in the first and second optical systems for use with an optical disk is as follows.

The objective lens is composed of three lenses that are a first lens that is a spherical lens, a second lens that is a spherical lens, and a third lens that is an aspherical lens, which are arranged in the stated order from a light source side. The first lens and the second lens are cemented to each other so as to compose a doublet. The first lens has a refractive index of not more than 1.54, and a light-source-side surface and an optical-disk-side surface of the first lens have a same radius of curvature of not more than 3.1 mm. The second lens has a refractive index of not less than 1.7. The third lens has a refractive index of not less than 1.75 and a thickness of not less than 1.85 mm, and has an aspherical surface on the light source side and a flat surface on an optical disk side.

A third preferred configuration of the objective lens in the first and second optical systems for use with an optical disk is as follows.

The objective lens is composed of three lenses that are a first lens that is a spherical lens, a second lens that is a spherical lens, and a third lens that is an aspherical lens, which are arranged in the stated order from a light source side. The first lens and the second lens are cemented to each other so as to compose a doublet. The first lens has a refractive index of not more than 1.5, and a light-source-side surface and an optical-disk-side surface of the first lens have the same radius of curvature of not more than 2.6 mm. The second lens has a refractive index of not less than 1.74, and an optical-disk-side surface of the second lens has a radius of curvature of not less than 2.6 mm. The third lens has a refractive index of not less than 1.77 and a thickness of not less than 1.45 mm, and has an aspherical surface on the light source side and a flat surface on an optical disk side. The aspherical surface of the third lens has a radius of central curvature of not less than 0.9 mm and not more than 1.4 mm.

A fourth preferred configuration of the objective lens in the first and second optical systems for use with an optical disk is as follows.

The objective lens is composed of three lenses that are a first lens that is a spherical lens, a second lens that is a spherical lens, and a third lens that is an aspherical lens, which are arranged in the stated order from a light source side. The first lens and the second lens are cemented to each other so as to compose a doublet. The first lens has a refractive index of not less than 1.4 and not more than 1.5, and a light-source-side surface and an optical-disk-side surface of the first lens have the same radius of curvature of not less than 2.3 mm and not more than 2.6 mm. The second lens has a refractive index of not less than 1.74 and not more than 1.85, and an optical-disk-side surface of the second lens has a radius of curvature of not less than 2.6 mm. The third lens has a refractive index of not less than 1.77 and not more than 1.85, and a thickness of not less than 1.45 mm and not more than 1.8 mm, and has an aspherical surface on the light source side and a flat surface on an optical disk side. The aspherical surface of the third lens has a radius of central curvature of not less than 0.9 mm and not more than 1.4 mm.

The first through fourth preferred configurations of the objective lens specify desirable configurations for an objective lens having a focal distance of not more than 2.5 mm. Particularly, the first and second preferred configurations of the objective lens specify desirable configurations for an objective lens having a focal distance of 2.0 mm, while the third and fourth preferred configurations of the objective lens specify desirable configurations for an objective lens having a focal distance of 1.8 mm.

Since the objective lens is formed in a two-group three-piece configuration in which a doublet composed of two spherical lenses and one aspherical lens are arranged from the light source side to the optical disk side, as in the first through fourth preferred configurations of the objective lens, it is possible to allow the lens position adjustment to be performed only at one position, thereby facilitating the assembly. Furthermore, since the cementing surface is spherical, the lens surface can be evaluated as to the single lens as a whole, thereby facilitating the checking of the cementing precision.

With a configuration such that the first lens composing the doublet has the refractive index and the radius of curvature in the foregoing ranges, a light-source-side surface and an optical-disk-side surface of the first lens have the same radius of curvature, and the second lens has the refractive index in the foregoing range as in the configurations according to the first through fourth preferred configurations of the objective lens, an optical system having a focal distance of not more than 2.5 mm is allowed to have a sufficient focal power. Furthermore, in a doublet, a degree of correction of a chromatic aberration can be adjusted by the curvature of the cementing surface and the dispersion of two types of hyaline materials to be cemented, and with the current hyaline materials, correlations are recognized between the refractive indices and the dispersion. According to the aforementioned combination of the radius of curvature of the cementing surface and the refractive indices of the first and second lenses, the excellent correction of a chromatic aberration can be achieved. It is preferable to set the radius of curvature of the first lens as small as possible, since it enables the correction of a more intense chromatic aberration. Furthermore, in the case where the focal distance is not more than 2.5 mm, if an optical system having a numerical aperture of 0.85 is assumed, the aperture diameter is not more than 4.25 mm, thereby allowing the further size reduction. Furthermore, since the light-source-side surface and the optical-disk-side surface of the first lens have the same radius of curvature, it is unnecessary to distinguish the front and rear sides of the first lens. Therefore, this makes the first lens suitable for mass production.

In the case where the first lens is caused to have a radius of curvature of not more than 3.1 mm as in the second preferred configuration of the objective lens, it is possible to correct a more intense chromatic aberration, as compared with the first preferred configuration of the objective lens in which the first lens has a radius of curvature of not more than 3.3 mm.

Furthermore, in the case where the first lens has a refractive index of not more than 1.5 and the light-source-side surface and the optical-disk-side surface of the first lens have the same radius of curvature of not more than 2.6 mm, and the second lens has a refractive index of not less than 1.74 and an optical-disk-side surface of the second lens has a radius of curvature of not less than 2.6 mm as in the third preferred configuration of the objective lens, it is possible to correct a more intense chromatic aberration and to further shorten the focal distance of the lens.

Furthermore, in the case where the first lens has a refractive index of not less than 1.4 and not more than 1.5 and the light-source-side surface and the optical-disk-side surface of the first lens have the same radius of curvature of not less than 2.3 mm and not more than 2.6 mm, and the second lens has a refractive index of not less than 1.74 and not more than 1.85 and an optical-disk-side surface of the second lens has a radius of curvature of not less than 2.6 mm as in the fourth preferred configuration of the objective lens, it is possible to correct a more intense chromatic aberration, and additionally, to further shorten the focal distance of the lens, thereby enabling the further size reduction of the system. Moreover, it also is possible to make the configuration more practical. In the case where the refractive index of the first lens is less than 1.4, the focal power is insufficient, and the hyaline materials cost considerably high. Though the chromatic aberration can be corrected more excellently as the radius of curvature of the first lens is decreased, a radius of curvature thereof of less than 2.3 mm, which is too small, excessively increases the thickness of the lens, and hence increases the weight thereof, thereby making it impossible for the actuator to control the same precisely. Furthermore, this also makes the spherical surface processing with precision difficult, thereby making the lens not suitable for the mass production. In the case where the refractive index of the second lens exceeds 1.85, the transmittance thereof decreases significantly with respect to blue-color light, and this makes it impossible to perform the recording and/or reproduction of information.

In the case where the third lens has a refractive index of not less than 1.68 and has an aspherical surface on a light source side as in the first preferred configuration of the objective lens, an angle formed between an optical axis and a tangent plane with respect to an outermost portion of the aspherical surface on the light source side is not more than 60°. Therefore, it is possible to ensure the processing precision.

Furthermore, in the case where the third lens has a refractive index of not less than 1.75 and has an aspherical surface on a light source side as in the second preferred configuration of the objective lens, an angle formed between an optical axis and a tangent plane with respect to an outermost portion of the aspherical surface on the light source side is approximately 55°. Therefore, it is possible to improve the processing precision.

Furthermore, in the case where the third lens has a refractive index of not less than 1.77 and has an aspherical surface on a light source side as in the third preferred configuration of the objective lens, an angle formed between an optical axis and a tangent plane with respect to an outermost portion of the aspherical surface on the light source side is approximately 52°. Therefore, it is possible to improve the processing precision further.

Furthermore, according to the fourth preferred configuration of the objective lens, the third lens has a refractive index of not less than 1.77 and not more than 1.85, and has an aspherical surface on a light source side. By setting the refractive index to be not less than 1.77, an angle formed between an optical axis and a tangent plane with respect to an outermost portion of the aspherical surface on the light source side is not more than 52°. Therefore, it is possible to improve the processing precision further. However, in the case where the refractive index exceeds 1.85, the transmittance decreases with respect to blue-color light, and this makes it impossible to perform the recording and/or reproduction of information.

Furthermore, in the case where the third lens has a flat surface on an optical disk side as in the first through fourth preferred configurations of the objective lens, flat surface grinding is applicable, thereby allowing the profile irregularity to be ensured. Besides, since only one aspherical surface is present in the whole optical system, high-order aberrations caused by the aspherical surface processing can be minimized.

In the case where the third lens has a thickness of not less than 1.45 mm as in the third and fourth preferred configurations of the objective lens, assembly tolerances can be increased. Furthermore, by setting the thickness of the third lens to be not less than 1.85 mm as in the first and second preferred configurations of the objective lens, the assembly tolerances can be increased further, also in the case of a lens having a focal distance of not less than 2 mm.

Furthermore, by setting a radius of central curvature of the aspherical surface of the third lens to be not less than 0.9 mm and not more than 1.4 mm as in the third and fourth preferred configurations of the objective lens, it is possible to carry out the grinding by means of a grindstone, thereby making it possible to obtain a highly precise aspherical surface readily.

Next, a fifth preferred configuration of the objective lens in the first and second optical systems for use with an optical disk is as follows.

The objective lens is composed of two lenses that are a first lens in a meniscus shape that is convex on a light source side and a second lens in a planoconvex shape that is flat on an optical disk side and is convex on a light source side, which are arranged in the stated order from the light source side. Both of the first lens and the second lens are made of resin materials.

According to the foregoing fifth preferred configuration of the objective lens, the objective lens is composed of two lenses made of resin materials. Therefore, the weight reduction of the objective lens can be achieved.

Furthermore, in the first and second optical systems for use with an optical disk, it is preferable that a diffraction grating is formed on at least one surface of at least one lens among the lenses composing the objective lens.

According to the foregoing preferred configuration, it is possible to allow the objective lens, for instance, to have an achromatic effect and the compatibility to two wavelengths, without increasing the number of component lenses.

Furthermore, in the first and second optical systems for use with an optical disk, it is preferable that a third-order astigmatism, generated in the case where a third-order coma generated when tilting of the optical disk by 0.7 degree is corrected by tilting the objective lens, is not more than 5.0 m$\lambda$.

With the foregoing preferred configuration, in the case where a third-order coma caused by warpage of an optical disk or the like is corrected by tilting the objective lens, it is possible to suppress a remaining astigmatic aberration to a further lower degree, and therefore to ensure excellent recording and/or recording.

Next, an optical head device of the present invention, for use with an optical disk, is an optical head device for performing the recording and/or reproducing of information to and/or from an optical disk, and the optical head device includes the first or second optical system described above, and a mechanism for tilting the objective lens relative to the optical axis so as to correct a third-order coma generated due to a tilt of the optical disk.

With this configuration, in the case where a third-order coma caused by warpage of an optical disk or the like is corrected by tilting the objective lens, it is possible to suppress a remaining astigmatic aberration to a low degree, and therefore ensure excellent recording and/or recording.

Furthermore, since the mechanism for tilting the objective lens is provided, a third-order coma generated by tilting of a disk that is being subjected to recording or reproduction can be corrected currently, thereby allowing a stable operation to be implemented.

The above-described optical head device of the present invention, for use with an optical disk, preferably further includes a luminous flux separating optical system for separating a luminous flux modulated at the information recording surface of the optical disk, and a photodetector for receiving the luminous flux modulated at the information recording surface of the optical disk.

Furthermore, an optical drive device of the present invention is an optical drive device for recording and/or reproducing information to and/or from an optical disk, and includes the above-described optical head device of the present invention for use with an optical disk.

With this configuration, in the case where a third-order coma caused by warpage of an optical disk or the like is corrected by tilting the objective lens, it is possible to suppress a remaining astigmatic aberration to a low degree, and therefore ensure excellent recording and/or recording.

Furthermore, since the mechanism for tilting the objective lens is provided, a third-order coma generated by tilting of a disk that is being subjected to recording or reproduction can be corrected currently, thereby allowing a stable operation to be implemented.

DESCRIPTION OF THE INVENTION

The following will more specifically describe an optical system for use with an optical disk, an optical head device for use with an optical disk, and an optical drive device according to the present invention, while referring to the drawings.

First Embodiment

Figure 1:
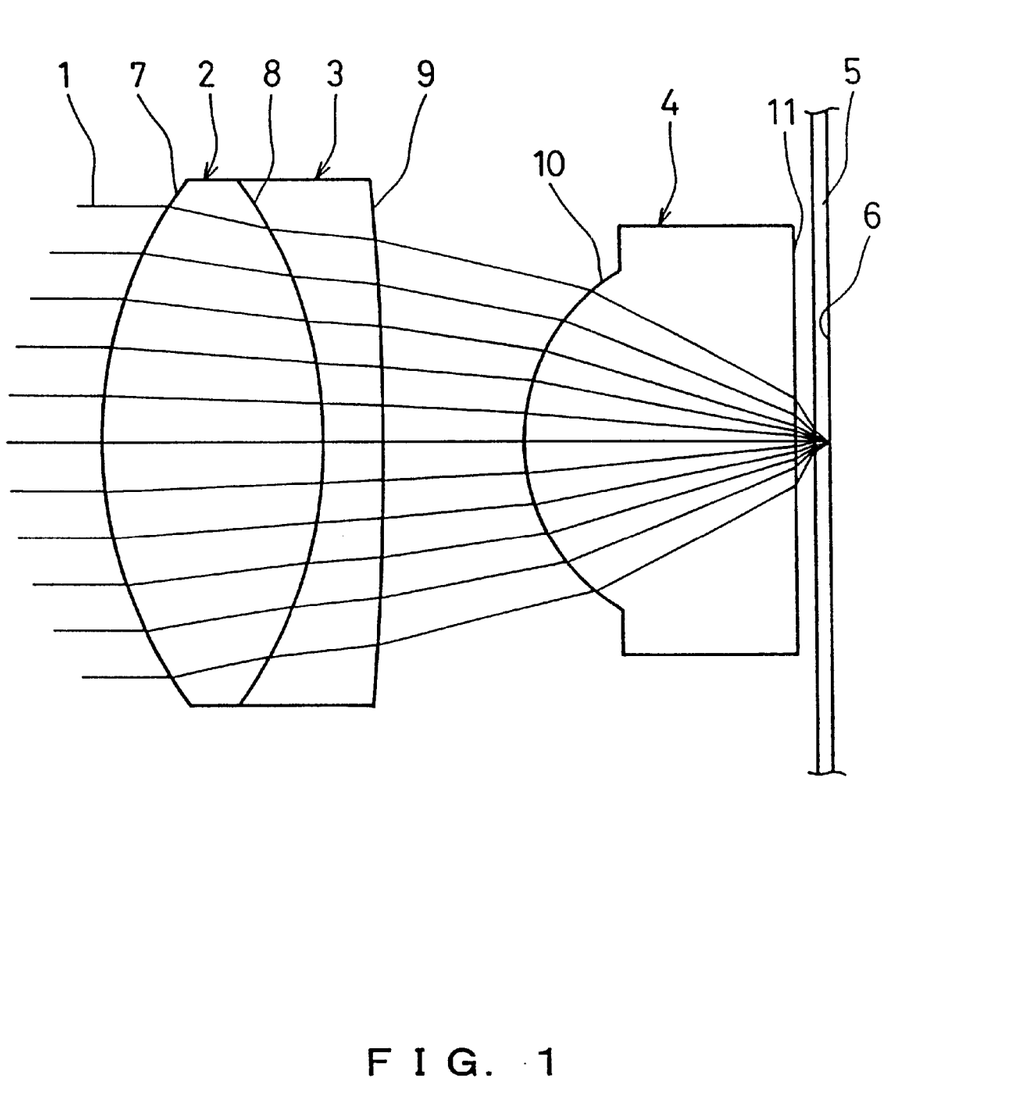
FIG. 1 is a view illustrating a configuration of a three-piece objective lens according to a first embodiment of the present invention.

FIG. 1 is a view illustrating an optical path of an objective lens according to the first embodiment, which composes an optical system for use with an optical disk according to the present invention.

An objective lens of the present embodiment is formed by arranging a first lens 2, a second lens 3, and a third lens 4 in the stated order from a light source side. The first lens 2 and the second lens 3 are cemented with each other via a cementing surface 8. Both the first lens 2 and the second lens 3 are spherical lenses, while the third lens 4 is an aspherical lens whose surface 10 on the light source side is aspherical and whose surface 11 on an optical disk side is flat.

As shown in FIG. 1, a collimated luminous flux 1 enters the first lens 2 through a first surface 7 thereof on the light source side, passes the cementing surface 8 for cementing the same to the second lens, enters the second lens 3, leaves the second lens 3 through a second surface 9 thereof on an information recording surface side, then, enters the third lens 4 through the first surface 10 thereof on a first lens side, and leaves the same through the second surface 11 thereof on the information recording surface side. Thereafter, the luminous flux is focused on an information recording surface 6 on an optical disk 5.

Specific examples of numerical values of the objective lens according to the first embodiment of the present invention are shown below. It should be noted that the lenses composing the objective lens are referred to as first, second, and third lenses, respectively, in the stated order from the light source side, and a surface on the light source side and a surface of the optical disk side of each lens are referred to as first and second surfaces, respectively. Further, the optical disk is a parallel plate. Abbreviations shown below are used commonly to express the examples of numerical values of the first through third embodiments.

W: used wavelength (nm)
f: focal distance of the objective lens (mm)
R11: radius of curvature of the first surface of the first lens (mm)
R12: radius of curvature of the second surface of the first lens (mm)
R21: radius of curvature of the first surface of the second lens (mm)
R22: radius of curvature of the second surface of the second lens (mm)
R31: radius of curvature of the first surface of the third lens (mm)
R32: radius of curvature of the second surface of the third lens (mm)
E1: distance between the first lens and the second lens (mm)
E2: distance between the second lens and the third lens (mm)
d1: thickness of the first lens (mm)
d2: thickness of the second lens (mm)
d3: thickness of the third lens (mm)
n1: refractive index of the first lens with respect to the used wavelength
n2: refractive index of the second lens with respect to the used wavelength
n3: refractive index of the third lens with respect to the used wavelength
nd: refractive index of an optical disk substrate with respect to the used wavelength
t: thickness of the optical disk substrate on the information recording surface (mm)
WD: working distance (mm)
NA: numerical aperture of a lens AB: third-order spherical aberration (mλ) with respect to the used wavelength CA: chromatic aberration (μm/nm) in a range of the used wavelength ±10 nm AS: third-order astigmatism (mλ) generated when a third-order coma generated when the optical disk tilts 0.7 degree is corrected by tilting the objective lens so that the third-order coma becomes 0 mλ.

LA: third-order astigmatism generated when the objective lens is tilted 0.7 degree Furthermore, an aspherical shape of a lens is expressed by a formula (1) shown below:

$$\frac{c_j h^2}{1+\sqrt{\{1-(1+k_j)c_j^2 h^2\}}} + \sum_{i=1}^{n} A_{j,i} h^i \quad (1)$$

where:

h represents a height from the optical axis ($\sqrt{x^2+y^2}$);

$c_j$ represents a curvature of the j'th surface at a vertex of the lens surface (=$1/R_j$, $R_j$ represents a radius of curvature);

$k_j$ represents a conic constant of the j'th surface; and $A_{j,i}$ represents an i'th-order aspherical surface coefficient of the j'th surface.

Concrete examples of numerical values in the first embodiment of the present invention are shown below. The first surface 10 of the third lens 4 is an aspherical surface expressed by the above formula (1).

W=405
f=2.0
R11=3.06
R12=−3.06
R21=−3.06
R22=−29.00
R31=1.402969
R32=flat
E1=0
E2=1.0
d1=1.62
d2=0.4
d3=1.931
n1=1.53017
n2=1.72949
n3=1.77855
n32 1.61736
t=0.1
WD=0.150
NA=0.85
$k_1$=−1.043332×10$^{-0}$
$A_{1,4}$=3.917135×10$^{-2}$ $A_{1,6}$=8.884507×10$^{-3}$
$A_{1,8}$=−3.43969×10$^{-3}$
$A_{1,10}$=6.070736×10$^{-3}$
$A_{1,12}$=−3.002026×10$^{-3}$ (The first surface concerning the aspherical surface coefficient is the first surface of the third lens.)

AB=1.1
CA=0.05
AS=2.4
LA=2.4

With the objective lens of the present embodiment, in the case where a third-order coma generated due to tilting of an optical disk of approximately 0.7 degree that is caused by warpage of the disk or the like is corrected by tilting the objective lens by means of, for instance, a tilt actuator, a third-order astigmatism that remains after the correction is 2.4 mλ, which is too small to cause a problem in the practical application. Therefore, the use of the objective lens of the present invention ensures excellent recording/reproduction.

Furthermore, since the chromatic aberration in the range of 405 nm±10 nm is 0.05 μm/nm because of the first lens and the second lens, an aberration hardly occurs even in the case where a semiconductor laser beam source with a broader spectral bandwidth is used.

Furthermore, since the first and second lenses have a distance of 0 therebetween and are cemented to each other when used, the lens adjustment at only one position suffices, which therefore facilitates the adjustment.

Furthermore, since the second surface of the third lens is a surface at which the luminous flux has a small effective diameter, the processing of the same requires precision. In the present embodiment, since the surface is flat, the surface can be processed with high precision.

Furthermore, since 53d+16R−69f=+13, which means that −20<53d+16R−69f<20 is satisfied, it is possible to decrease a third-order astigmatism that is generated in the case where a third-order coma generated due to tilting of an optical disk is corrected by tilting the objective lens.

Furthermore, since the refractive index of the first lens is not more than 1.54, the refractive index of the second lens is not less than 1.7, and the radius of curvature of the first lens is not more than 3.3 mm, a chromatic aberration is reduced effectively.

Furthermore, since the refractive index of the third lens is not less than 1.68, it is possible to cause the first surface of the third lens to have a greater radius of central curvature, thereby facilitating the processing. Furthermore, since the third lens has a thickness of not less than 1.85 mm, it is possible to decrease a third-order astigmatism that is generated in the case where a third-order coma generated due to a tilt of an optical disk is corrected by tilting the objective lens. At the same time, this also allows a side-slip tolerance between the first and second lenses and the third lens to increase, thereby facilitating the assembly.

Second Embodiment

Figure 2:
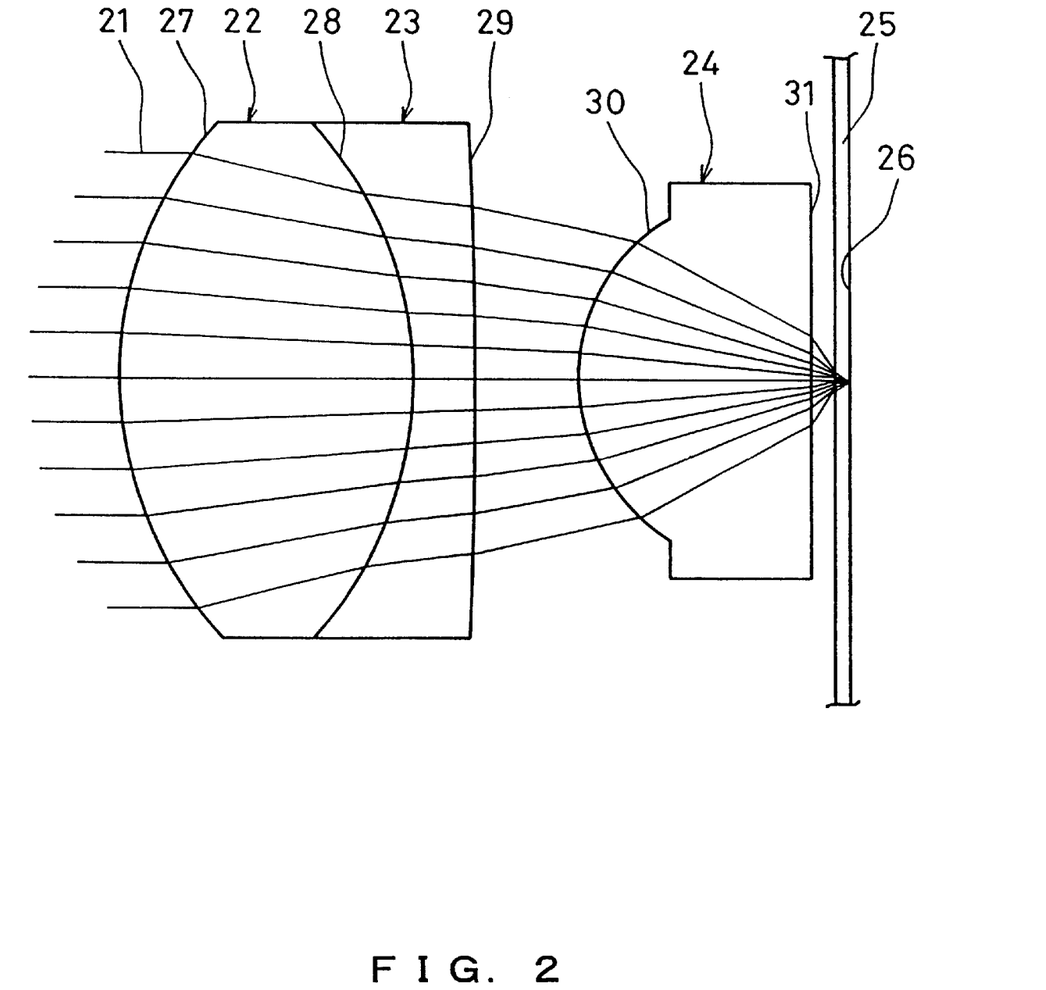
FIG. 2 is a view illustrating a configuration of a three-piece objective lens according to a second embodiment of the present invention.

FIG. 2 is a view illustrating an optical path of an objective lens according to the second embodiment, which composes an optical system for use with an optical disk according to the present invention.

An objective lens according to the present embodiment is formed by arranging a first lens 22, a second lens 23, and a third lens 24 in the stated order from a light source side. The first lens 22 and the second lens 23 are cemented with each other via a cementing surface 28. Both the first lens 22 and the second lens 23 are spherical lenses, while the third lens 24 is an aspherical lens whose surface 30 on the light source side is aspherical and whose surface 31 on an optical disk side is flat.

As shown in FIG. 2, a collimated luminous flux 21 enters the first lens 22 through a first surface 27 thereof on the light source side, passes the cementing surface 28 for cementing the same to the second lens, enters the second lens 23, leaves the second lens through a second surface 29 thereof on an information recording surface side, then, enters the third lens 24 through the first surface 30 thereof on a first lens side, and leaves the same through the second surface 31 thereof on the information recording surface side. Thereafter, the luminous flux is focused on an information recording surface 26 on an optical disk 25.

Specific examples of numerical values of the objective lens according to the second embodiment of the present invention are shown below. It should be noted that the lenses composing the objective lens are referred to as first, second, and third lenses, respectively, in the stated order from the light source side, and a surface on the light source side and a surface of the optical disk side of each lens are referred to as first and second surfaces, respectively. Further, the optical disk is a parallel plate. Abbreviations used in the examples of numerical values shown below are the same as those in the description of the first embodiment. The first surface 30 of the third lens 24 is an aspherical surface expressed by the aforementioned formula (1).

W=405
f=1.8
R11=2.5
R12=−2.5
R21=−2.5
R22=−40.0
R31=1.1430334
R32=flat
E1=0
E2=0.68
d1=2.0
d2=0.4
d3=1.5699
n1=1.49892
n2=1.74188
n3=1.77855
nd=1.61736
t=0.1
WD=0.150
NA=0.85
$k_1 = -9.242255 \times 10^{-1}$
$A_{1,4} = 5.904687 \times 10^{-2}$
$A_{1,6} = 2.003212 \times 10^{-2}$
$A_{1,8} = -8.180677 \times 10^{-3}$
$A_{1,10} = 2.240878 \times 10^{-2}$
$A_{1,12} = -1.725607 \times 10^{-2}$ (The first surface concerning the aspherical surface coefficient is the first surface of the third lens.)
AB=0.8
CA=0.02
AS=0.2
LA=6.1

With the objective lens of the present embodiment, in the case where a third-order coma generated due to tilting of an optical disk of approximately 0.7 degree that is caused by warpage of the disk or the like is corrected by tilting the objective lens by means of, for instance, a tilt actuator, a third-order astigmatism that remains after the correction is 0.2 mλ, which is too small to cause a problem in the practical application. Therefore, the use of the objective lens according to the present invention ensures excellent recording/reproduction.

Furthermore, since the chromatic aberration in the range of 405 nm±10 nm is 0.02 μm/nm because of the first lens and the second lens, an aberration hardly occurs even in the case where a semiconductor laser beam source with a broader spectral bandwidth is used.

Furthermore, since the first and second lenses have a distance of 0 therebetween and are cemented to each other when used, the lens adjustment at only one position suffices, which therefore facilitates the adjustment.

Furthermore, the second surface of the third lens is a surface at which the luminous flux has a small effective diameter, and the processing of the same requires precision. In the present embodiment, since the surface is flat, the surface can be processed with high precision.

Furthermore, since 53d+16R−69f=−1, which means that −20<53d+16R−69f<20 is satisfied, it is possible to decrease a third-order astigmatism that is generated in the case where a third-order coma generated due to tilting of an optical disk is corrected by tilting the objective lens.

Furthermore, since the refractive index of the first lens is not more than 1.5, the refractive index of the second lens is not less than 1.74, and the radius of curvature of the first lens is not more than 2.6 mm, a chromatic aberration is reduced effectively.

Furthermore, since the refractive index of the third lens is not less than 1.77, it is possible to cause the first surface of the third lens to have a greater radius of central curvature, thereby facilitating the processing. Furthermore, since the third lens has a thickness of not less than 1.45 mm, it is possible to decrease a third-order astigmatism that is generated in the case where a third-order coma generated due to tilting of an optical disk is corrected by tilting the objective lens. At the same time, this also allows a side-slip tolerance between the first and second lenses and the third lens to increase, thereby facilitating the assembly.

Third Embodiment

Figure 3:
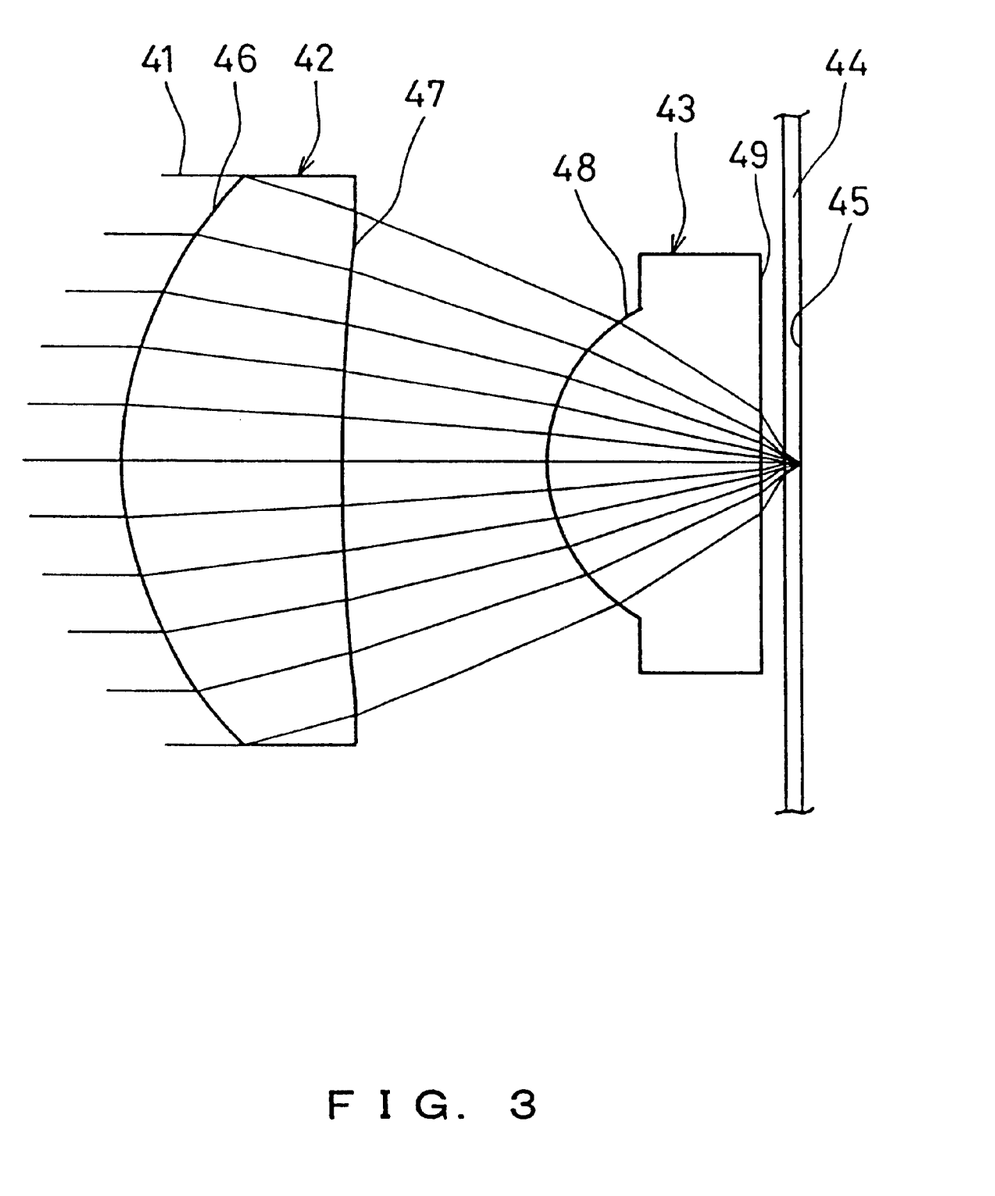
FIG. 3 is a view illustrating a configuration of a two-piece objective lens according to a third embodiment of the present invention.

FIG. 3 is a view illustrating an optical path of an objective lens according to the third embodiment, which composes an optical system for use with an optical disk according to the present invention.

An objective lens according to the present embodiment is formed by arranging a first lens 42 and a second lens 43 in the stated order from a light source side. The first lens 42 is in a meniscus shape that is convex on the light source side, and the second lens 43 is in a planoconvex shape that is flat on an optical disk side and is convex on the light source side.

As shown in FIG. 3, a collimated luminous flux 41 enters the first lens 42 through a first surface 46 thereof on the light source side, leaves the same through a second surface 47 thereof on a second lens side, enters the second lens 43 through a first surface 48 thereof on a first lens side, and leaves the same through a second surface 49 thereof on an information recording surface side. Thereafter, the luminous flux is focused on an information recording surface 45 on an optical disk 44.

Specific examples of numerical values of the objective lens according to the third embodiment of the present invention are shown below. It should be noted that the lenses composing the objective lens are referred to as first and second lenses, respectively, in the stated order from the light source side, and a surface on the light source side and a surface of the optical disk side of each lens are referred to as first and second surfaces, respectively. Further, the optical disk is a parallel plate. Abbreviations used in the examples of numerical values shown below are the same as those in the description of the first embodiment. The first surface 46 of the first lens 42 and the first surface 48 of the second lens 43 are aspherical surfaces expressed by the aforementioned formula (1). The first and second lenses 42 and 43 both are made of resin materials.

W=405
f=2.0
R11=2.140
R12=13.800
R21=1.0490944
R22=flat
E1=1.200
d1=1.3
d2=1.2484 n1=1.55990
n2=1.55990
nd=1.61736
t=0.1
WD=0.150
NA=0.85
$k_1=-5.657290\times10^{-1}$
$A_{1,4}=1.506741\times10^{-3}$
$A_{1,6}=1.851765\times10^{-4}$
$A_{1,8}=-2.137199\times10^{-4}$
$A_{1,10}=8.255417\times10^{-5}$
$A_{1,12}=-1.889478\times10^{-5}$
$k_3=-8.425991\times10^{-1}$
$A_{3,4}=7.116095\times10^{-2}$
$A_{3,6}=4.013898\times10^{-2}$
$A_{3,8}=-2.772649\times10^{-2}$
$A_{3,10}=7.731887\times10^{-2}$
$A_{3,12}=-3.480660\times10^{-2}$
(The first surface concerning the aspherical surface coefficient is the first surface of the first lens, and the third surface concerning the same is the first surface of the second lens.)
AB=3.6
AS=0.3
LA=2.6

With the objective lens of the present embodiment, in the case where a third-order coma generated due to tilting of an optical disk of approximately 0.7 degree that is caused by warpage of the disk or the like is corrected by tilting the objective lens by means of, for instance, a tilt actuator, a third-order astigmatism that remains after the correction is 0.3 mλ, which is too small to cause a problem in the practical application. Therefore, the use of the objective lens of the present invention ensures excellent recording/reproduction.

Furthermore, the second surface of the second lens is a surface at which the luminous flux has a small effective diameter, and the processing of the same requires precision. In the present embodiment, since the surface is flat, the surface can be processed with high precision.

Furthermore, since the objective lens is composed of two pieces of lenses both made of a resin, the weight reduction is achieved, thereby reducing loads on the actuator.

Furthermore, since the material is a resin, a diffraction grating is applied readily to the lens surface, and the application of a diffraction grating makes it possible to decrease a chromatic aberration further.

Fourth Embodiment

Figure 4:
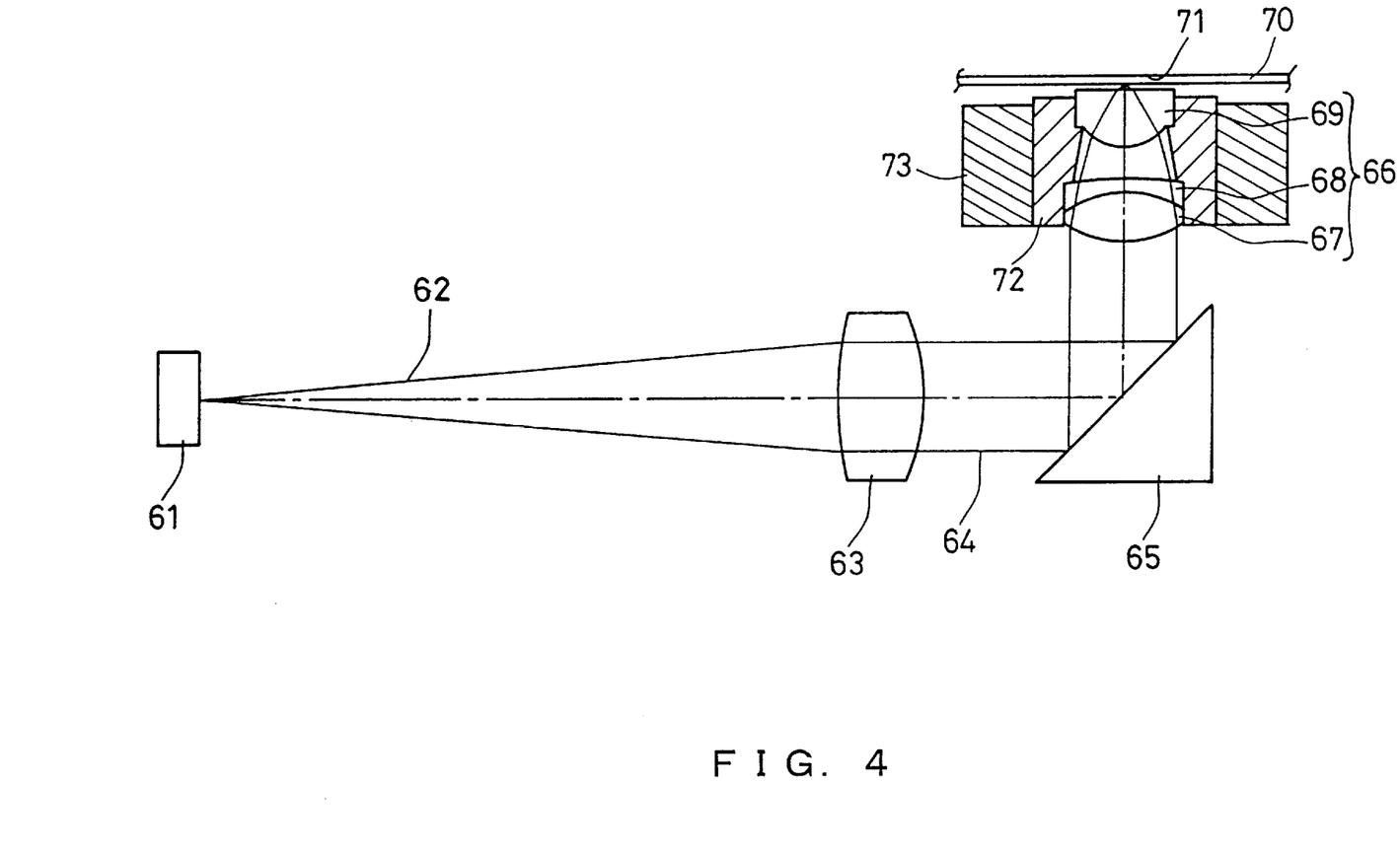
FIG. 4 is a view illustrating a configuration of an optical system and an optical head device for use with an optical disk according to a fourth embodiment of the present invention.

FIG. 4 is a view illustrating a configuration of an optical system and an optical head device for use with an optical disk according to the fourth embodiment of the present invention.

In FIG. 4, a diverging luminous flux 62 emitted from a semiconductor laser module 61 is converted into a substantially collimated luminous flux 64 by a collimator lens 63. An optical path of the collimated luminous flux 64 is redirected by a turning mirror (erecting mirror) 65, and the luminous flux successively passes a first lens 67, a second lens 68, and a third lens 69 in the stated order, which compose an objective lens 66, then passes a substrate of an optical disk 70, thereby becoming focused on an information recording surface 71. An intensity of reflected light of a focused light spot is modulated according to signals formed on the information recording surface 71, which have different reflectances. The laser beam reflected by the information recording surface 71 travels along the foregoing optical path in reverse, returning to the semiconductor module 61. Here, the semiconductor module 61 includes a luminous flux separating optical system that separates a light from light source, a light from a photodetector, a light going forward, and a light returning. Further, the objective lens 66 is the objective lens described in the first embodiment, and the first lens 67, the second lens 68, and the third lens 69 are fixed in a lens barrel 72. An actuator 73 for moving the lens barrel 72 actuates the lens barrel 72 in a tracking direction and in a focusing direction, not only to adjust the objective lens 66 to an optimal position, but also to tilt the lens barrel 72 relative to the optical axis according to tilting of a surface of the optical disk 70.

A third-order coma is generated when the optical disk 70 is warped or tilted. Here, the actuator 73 incorporating the lens barrel 72 of the objective lens 66 tilts the objective lens 66 according to tilting of the optical disk 70 or a degree of a third-order coma caused by the tilt of the optical disk 70. By so doing, the third-order coma can be corrected. A method for detecting the tilt of the optical disk 70 or the degree of the third-order coma caused by the tilt of the optical disk 70, and a concrete configuration of the actuator 73 for tilting the objective lens 66 are not particularly limited, and any known configurations are applicable.

As to a concrete configuration of the actuator 73 for tilting the objective lens 66, the actuator may be configured, for instance, in the same manner as that shown in FIGS. 6A and 6B. By providing pairs of the permanent magnets and coils shown in FIGS. 6A and 6B so that one pair is provided in a tangent direction of the optical disk and another pair is provided in a radial direction of the optical disk, the objective lens can be tilted in any desired direction relative to the optical disk. It should be noted that since usually a harmful third-order coma caused by tilting of an optical disk is generated by a tilt of an optical disk in the tangent direction in many cases, the provision of only one pair of the permanent magnets and coils in the tangent direction allows the major portion of the third-order coma caused by tilting of an optical disk to be corrected. It should be acknowledged that the configuration of the actuator 73 that tilts the objective lens 66 is not limited to that shown in FIGS. 6A and 6B.

In the present embodiment, a three-piece objective lens employed in the first embodiment is used as the objective lens 66, but alternatively the three-piece objective lens employed in the second embodiment or the two-piece objective lens employed in the third embodiment may be used.

Furthermore, in the present embodiment, a semiconductor module is used as a light source, but a laser beam source, a luminous flux separating optical system, and a photodetector may be arranged separately. Besides, though the first lens 67, the second lens 68, and the third lens 69 of the objective lens 66 are fixed by the lens barrel 72 in the present embodiment, they are not necessarily fixed.

Furthermore, a case where the optical head device of the present invention is employed in an optical disk device for direct recording and/or reproduction with respect to an optical disk is described as the present embodiment, but the optical head device may be employed in other devices, for instance, a laser beam recorder for the recording with respect to masters for DVDs, etc.

An optical drive device of the present invention is provided with the optical head device according to the fourth embodiment, and further includes a mechanism for rotating an optical disk, a mechanism for moving the optical head device in a radial direction of the optical disk, circuits for actuating and controlling these mechanisms, etc. Configurations of the optical drive device other than the optical head device are not particularly limited, and any known configurations are applicable.

As described above, according to the present invention, the use of a two-piece or three-piece objective lens suppresses a level of a third-order astigmatism generated when the objective lens is tilted relative to the optical axis, or suppresses a level of a third-order astigmatism generated in the case where a third-order coma generated by tilting of an optical disk is cancelled by tilting the objective lens. Therefore, even when an optical disk tilts during recording and/or reproduction, the recording and/or reproduction can be performed excellently.

The embodiments described above merely intend to clarify technical details of the present invention and the present invention should not be interpreted as being limited to such specific examples. The present invention can be carried out by being modified variously within a range of claims and without departing from its spirit and should be interpreted broadly.

What is claimed is:

1. An optical system for use with an optical disk, for recording and/or reproducing information to and/or from an optical disk, the optical system comprising:

a light source;

a collimating optical system for converting a luminous flux from the light source into a collimated light; and an objective lens for focusing the collimated light on an information recording surface of the optical disk, wherein the objective lens has a numerical aperture (NA) of not less than 0.82, the objective lens is composed of two or three lenses, and a third-order astigmatism generated in the case where the objective lens is tilted 0.7 degree relative to an optical axis is not more than 10 mλ.

2. The optical system according to claim 1, wherein the optical disk includes a transparent substrate with a thickness of approximately 0.1 mm on an objective lens side of the information recording surface, and a third-order astigmatism, generated in the case where a third-order coma generated when the optical disk tilts by 0.7 degree is corrected by tilting the objective lens, is not more than 10 mλ.

3. The optical system according to claim 1, wherein a third-order spherical aberration that occurs when the luminous flux is focused via a transparent substrate with a thickness of 0.1 mm is not more than 70 ml.

4. The optical system according to claim 1, wherein a chromatic aberration of the objective lens at a wavelength of the light source is not more than 0.1 mm/nm.

5. The optical system according to claim 1, wherein the objective lens is composed of three lenses, the three lenses are a first lens that is a spherical lens, a second lens that is a spherical lens, and a third lens that is an aspherical lens, which are arranged in the stated order from a light source side, and the first lens and the second lens are cemented to each other so as to compose a doublet.

6. The optical system according to claim 5, wherein the third lens has a flat surface on an optical disk side.

7. The optical system according to claim 5, wherein a light-source-side surface and an optical-disk-side surface of the first lens have a same radius of curvature.

8. The optical system according to claim 5, wherein the third lens has an aspherical surface on a light source side.

9. The optical system according to claim 5, wherein a light-source-side surface and an optical-disk-side surface of the first lens have a same radius of curvature, and a relationship expressed as below is satisfied:

$$-20<53d+16R-69f<20$$

where R represents the radius of curvature of the surfaces of the first lens, d represents a thickness of the third lens, and f represents a focal distance of the objective lens.

10. The optical system according to claim 1, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.54, and a light-source-side surface and an optical-disk-side surface of the first lens have a same radius of curvature of not more than 3.3 mm, the second lens has a refractive index of not less than 1.7, and the third lens has a refractive index of not less than 1.68 and a thickness of not less than 1.85 mm, and has an aspherical surface on the light source side and a flat surface on an optical disk side.

11. The optical system according to claim 1, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.54, and a light-source-side surface and an optical-disk-side surface of the first lens have a same radius of curvature of not more than 3.1 mm, the second lens has a refractive index of not less than 1.7, and the third lens has a refractive index of not less than 1.75 and a thickness of not less than 1.85 mm, and has an aspherical surface on the light source side and a flat surface on an optical disk side.

12. The optical system according to claim 1, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.5, and a light-source-side surface and an optical-disk-side surface of the first lens have a same radius of curvature of not more than 2.6 mm, the second lens has a refractive index of not less than 1.74, and an optical-disk-side surface of the second lens has a radius of curvature of not less than 2.6 mm, and the third lens has a refractive index of not less than 1.77 and a thickness of not less than 1.45 mm, and has an aspherical surface on the light source side and a flat surface on an optical disk side, the aspherical surface having a radius of central curvature of not less than 0.9 mm and not more than 1.4 mm.

13. The optical system according to claim 1, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not less than 1.4 and not more than 1.5, and a light-source-side surface and an optical-disk-side surface of the first lens have a same radius of curvature of not less than 2.3 mm and not more than 2.6 mm, the second lens has a refractive index of not less than 1.74 and not more than 1.85, and an optical-disk-side surface of the second lens has a radius of curvature of not less than 2.6 mm, and the third lens has a refractive index of not less than 1.77 and not more than 1.85, and a thickness of not less than 1.45 mm and not more than 1.8 mm, and has an aspherical surface on the light source side and a flat surface on an optical disk side, the aspherical surface having a radius of central curvature of not less than 0.9 mm and not more than 1.4 mm.

14. The optical system according to claim 1, wherein the objective lens is composed of two lenses, the two lenses are a first lens in a meniscus shape that is convex on a light source side, and a second lens in a planoconvex shape that is flat on an optical disk side and is convex on a light source side, which are arranged in the stated order from the light source side, and both of the first lens and the second lens are made of resin materials.

15. The optical system according to claim 1, wherein a diffraction grating is formed on at least one surface of at least one lens among the lenses composing the objective lens.

16. The optical system according to claim 2, wherein a third-order astigmatism, generated in the case where a third-order coma generated when the optical disk tilts 0.7 degree is corrected by tilting the objective lens, is not more than 5.0 ml.

17. An optical head device for use with an optical disk, for recording and/or repro information to and/or from an optical disk, the optical head device comprising:

the optical system according to claim 1; and a mechanism for tilting the objective lens relative to the optical axis so as to correct a third-order coma generated due to tilting of the optical disk.

18. The optical head device according to claim 17, further comprising:

a luminous flux separating optical system for separating a luminous flux modulated at the information recording surface of the optical disk; and a photodetector for receiving the luminous flux modulated at the information recording surface of the optical disk.

19. The optical drive device for recording and/or reproducing information to and/or from an optical disk, the optical drive device comprising the optical head device according to claim 17.

20. An optical system for use with an optical disk, for recording and/or reproducing information to and/or from an optical disk, the optical system comprising:

a light source;

a collimating optical system for converting a luminous flux from the light source into a collimated light; and an objective lens for focusing the collimated light on an information recording surface of the optical disk, wherein the objective lens has a numerical aperture (NA) of not less than 0.82, the objective lens is composed of two or three lenses, the optical disk includes a transparent substrate with a thickness of approximately 0.1 mm on an objective lens side of the information recording surface, and a third-order astigmatism generated in the case where a third-order coma generated in the case where the optical disk tilts 0.7 degree is corrected by tilting the objective lens is not more than 10 m$\lambda$.

21. The optical system according to claim 20, wherein a third-order spherical aberration that occurs when the luminous flux is focused via a transparent substrate with a thickness of 0.1 mm is not more than 70 ml.

22. The optical system according to claim 20, wherein a chromatic aberration of the objective lens at a wavelength of the light source is not more than 0.1 mm/nm.

23. The optical system according to claim 20, wherein the objective lens is composed of three lenses, the three lenses are a first lens that is a spherical lens, a second lens that is a spherical lens, and a third lens that is an aspherical lens, which are arranged in the stated order from a light source side, and the first lens and the second lens are cemented to each other so as to compose a doublet.

24. The optical system according to claim 23, wherein the third lens has a flat surface on an optical disk side.

25. The optical system according to claim 23, wherein a light-source-side surface and an optical-disk-side surface of the first lens have a same radius of curvature.

26. The optical system according to claim 23, wherein the third lens has an aspherical surface on a light source side.

27. The optical system according to claim 23, wherein a light-source-side surface and an optical-disk-side surface of the first lens have a same radius of curvature, and a relationship expressed as below is satisfied:

$$-20<53d+16R-69f<20$$

where R represents the radius of curvature of the surfaces of the first lens, d represents a thickness of the third lens, and f represents a focal distance of the objective lens.

28. The optical system according to claim 20, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.54, and a light-source-side surface and an optical-disk-side surface of the first lens have a same radius of curvature of not more than 3.3 mm, the second lens has a refractive index of not less than 1.7, and the third lens has a refractive index of not less than 1.68 and a thickness of not less than 1.85 mm, and has an aspherical surface on the light source side and a flat surface on an optical disk side.

29. The optical system according to claim 20, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.54, and a light-source-side surface and an optical-disk-side surface of the first lens have a same radius of curvature of not more than 3.1 mm, the second lens has a refractive index of not less than 1.7, and the third lens has a refractive index of not less than 1.75 and a thickness of not less than 1.85 mm, and has an aspherical surface on the light source side and a flat surface on an optical disk side.

30. The optical system according to claim 20, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not more than 1.5, and a light-source-side surface and an optical-disk-side surface of the first lens have a same radius of curvature of not more than 2.6 mm, the second lens has a refractive index of not less than 1.74, and an optical-disk-side surface of the second lens has a radius of curvature of not less than 2.6 mm, and the third lens has a refractive index of not less than 1.77 and a thickness of not less than 1.45 mm, and has an aspherical surface on the light source side and a flat surface on an optical disk side, the aspherical surface having a radius of central curvature of not less than 0.9 mm and not more than 1.4 mm.

31. The optical system according to claim 20, wherein the objective lens is composed of three lenses, the three lenses are a first lens that is a spherical lens, a second lens that is a spherical lens, and a third lens that is an aspherical lens, which are arranged in the stated order from a light source side, the first lens and the second lens are cemented to each other so as to compose a doublet, the first lens has a refractive index of not less than 1.4 and not more than 1.5, and a light-source-side surface and an optical-disk-side surface of the first lens have a same radius of curvature of not less than 2.3 mm and not more than 2.6 mm, the second lens has a refractive index of not less than 1.74 and not more than 1.85, and an optical-disk-side surface of the second lens has a radius of curvature of not less than 2.6 mm, and the third lens has a refractive index of not less than 1.77 and not more than 1.85, and a thickness of not less than 1.45 mm and not more than 1.8 mm, and has an aspherical surface on the light source side and a flat surface on an optical disk side, the aspherical surface having a radius of central curvature of not less than 0.9 mm and not more than 1.4 mm.

32. The optical system according to claim 20, wherein the objective lens is composed of two lenses, the two lenses are a first lens in a meniscus shape that is convex on a light source side, and a second lens in a planoconvex shape that is flat on an optical disk side and is convex on a light source side, which are arranged in the stated order from the light source side, and both of the first lens and the second lens are made of resin materials.

33. The optical system according to claim 20, wherein a diffraction grating is formed on at least one surface of at least one lens among the lenses composing the objective lens.

34. The optical system according to claim 20, wherein a third-order astigmatism, generated in the case where a third-order coma generated when the optical disk tilts 0.7 degree is corrected by tilting the objective lens, is not more than 5.0 ml.

35. An optical head device for use with an optical disk, for recording and/or reproducing information to and/or from an optical disk the optical head device comprising:

the optical system according to claim 20; and a mechanism for tilting the objective lens relative to the optical axis so as to correct a third-order coma generated due to tilting of the optical disk.

36. The optical head device according to claim 35, further comprising:

a luminous flux separating optical system for separating a luminous flux modulated at the information recording surface of the optical disk; and a photodetector for receiving the luminous flux modulated at the information recording surface of the optical disk.

37. The optical drive device for recording and/or reproducing information to and/or from an optical disk, the optical drive device comprising the optical head device according to claim 35.

* * * * *